United States Patent Office 2,899,417
Patented Aug. 11, 1959

2,899,417

POLYMERIZATION PROCESS

George W. Hooker, New Brighton, Pa., assignor to Koppers Company, Inc., a corporation of Delaware No Drawing. Application June 6, 1955
Serial No. 513,575

15 Claims. (Cl. 260—94.9)

This application is concerned with a process for the polymerization of ethylene. More particularly the application is concerned with a process for the polymerization of ethylene in the presence of a catalyst which is a mixture of (A) and (B) in which (A) has the general formula RR'AlX, in which R is a member selected from the group consisting of hydrogen, alkyl radicals and aryl radicals, R' is a member selected from the group consisting of hydrogen, alkyl radicals, and aryl radicals, and in which X is a member selected from the group consisting of hydrogen, halogen atoms, alkyl, alkyloxy radicals, aryloxy radicals, secondary amino radicals, secondary acid amide radicals, mercapto radicals, thiophenyl radicals, radicals of carboxylic acids and radicals of sulfonic acids, and in which (B) is a compound of a metal selected from the group consisting of metals of groups IV-B, V-B, and VI-B of the periodic system including thorium and uranium at temperatures under the decomposition temperature of the particular catalyst, that is in the order of 100° C. and at pressures of less than 100 atmospheres. Suitably these catalysts are slurried or dissolved in an inert solvent such as, for example, heptane, hexane, pentane, cyclohexane, tetrahydronaphthalene, decahydronaphthalene, benzene, xylene, o-dichlorobenzene, chlorinated naphthalene, dibutylether, and the like.

It is known, as disclosed in Ziegler Belgian Patent 533,362, issued May 16, 1955, to polymerize ethylene in the presence of the aforementioned catalysts and inert solvents. These polymerizations have been accomplished by preparing a mixture of catalyst components (A) and (B) in the inert solvent in a glass-lined vessel equipped with a stirrer and introducing ethylene below the liquid level while stirring until a polymer slurry is obtained. During the course of such polymerizations, it has been observed that there are increases in pressure within the system which cause gas to be vented from said system at whatever predetermined pressure a relief valve has been set for. It has further been observed that erratic and unpredictable consequences ensue from such polymerizations—that is, for example, the amount of product obtained per part of ethylene introduced or per part catalyst mixture utilized varies widely.

It has now been found as a feature of this invention that it is possible to overcome the difficulties of erratic operation and widely varying results. That is, the present invention provides a means of operating the aforedescribed polymerization method in such a manner as to insure satisfactory and acceptable results particularly in that the amount of polymer produced per part ethylene introduced into the system approximates about at least 90–95 percent.

The present invention comprises, in a process for the polymerization of ethylene which comprises contacting in a reaction zone ethylene and a catalyst in the presence of an inert solvent, the steps of venting gas from said reaction zone while removing condensable vapors and constituents soluble therein from said vented gas and returning said removed vapors and constituents to the reaction zone. Excellent results are obtained when the reaction zone is maintained in the range of from about 50° C. to 85° C.

The benefit of this invention is conveniently obtained by providing the reaction vessel with a suitable reflux condenser between the vessel and the pressure relief valve. Surprisingly, this simple expediency spells the difference between success and failure. For example, out of 28 runs utilizing one of the aforedescribed catalysts, that is diethylaluminum chloride and titanium tetrachloride as catalyst components A and B, and hexane or heptane as the inert solvent, 24 runs were unsatisfactory for one reason or another in a vessel not equipped with a reflux condenser. For example there were observed periodic pressure increases in the system which causes venting of gas after which the polymerization deteriorated for example, giving low yields in the neighborhood of approximately 0.3 to 0.5 part polymer or less per part ethylene introduced. Additionally, unacceptable off-gas rates were observed which are reflected in the unsatisfactory yields. On the other hand, by the simple expediency of equipping the reaction vessel with a reflux condenser between the vessel and the pressure relief valve, uniformly satisfactory and acceptable results are obtained, that is, for example, as compared to the 24 failures in 28 runs, there are substantially no failures utilizing the method of this invention. That is, operating as above described there are obtained approximately 0.9 to 0.95 part polymer per part ethylene introduced.

It is not known by what mechanism the method of this invention obtains the uniform and desirable results. It is theorized, however, that passing the vent gas through a reflux condenser suitable to remove therefrom the inert solvent vapors and material soluble therein prevents the escape of catalyst constituents necessary for satisfactory catalyst activity. Prior to the present invention, it is theorized that the constituents were carried along in the stream of vented gas thus causing deterioration of the polymerization reaction.

As used herein the terms "parts" and "percent" mean parts and percent by weight unless otherwise specified.

The following examples are illustrative, but not restrictive of the present invention:

*Example 1*

To a suitable glass-lined, stirrer-equipped vessel there is added 2280 parts heptane, 5.4 parts diethylaluminum chloride and 8.3 parts titanium tetrachloride. This mixture is stirred for about one hour at 38° C. Thereafter ethylene is added and the rate of addition at the indicated time intervals is observed as follows:

| Time | Rate of Ethylene in Addition, Pounds per Hour |
|---|---|
| 3 minutes | 66 |
| 8 minutes | 86 |
| 13 minutes | 99 |
| 18 minutes | 134 |
| 28 minutes | *122 |
| 90 minutes | **122 |
| 120 minutes | ***122 |

*27 pounds per hour of gas at 5 p.s.i. reactor pressure.
**30 pounds per hour of gas as above.
***31 pounds per hour of gas as above.

The run is shut down at the end of 2½ hours because of the excessive off-gas rates observed as indicated by the asterisk.

There is obtained out of a total of 165 parts ethylene introduced a yield of 75 parts polymer. The temperature of the reactor is observed to be in the range of 54–68° C.

This example is illustrative of the aforementioned 28 runs, 24 of which were unsatisfactory or complete failures.

*Example 2*

To the reactor vessel of Example 1 equipped with a reflux condenser between the reaction zone and the pressure relief valve is added 2280 parts heptane, 5.4 parts diethylaluminum chloride and 8.3 parts of titanium tetrachloride. This mixture is stirred for about one hour at 38° C. and thereafter ethylene is added below the liquid level at a rate of approximately 125 parts ethylene per hour. At the end of 4½ hours there is observed difficulty in stirirng the thick polymer slurry. The addition of ethylene is stopped. There is recovered 524 parts polymer as compared to the 565 parts ethylene added. There is noted, during the course of the reaction, condensation in the reflux condenser of vapors of the inert hydrocarbon which condensate is returned to the reaction zone. Evidently these vapors are entrained in the vented gas and are removed therefrom by the condenser. Repetition of the foregoing example yields consistently uniform and satisfactory results.

It will be understood that, in place of the particular catalyst mixture utilized in Example 2, the various other catalyst mixtures aforedescribed can be utilized to yield satisfactory results. It will be noted that variation of the molar ratio of catalyst components (A) and (B) as well as variation of the amount of catalyst will give variation in the molecular weight of the polymer product. Broadly, the molar ratio of alkylaluminum halide to inorganic salt can vary in the range 0.5:1 to 12:1; preferably the ratio is in the range 0.75:1 to 2:1. In general, the amount of catalyst utilized varies from about 5 to 15 millimols of each of the catalyst components (A) and (B) per pound of polymer produced. Further, mixtures of titanium tetrachloride with one of di-iso-butylaluminum hydride, triethylaluminum, tributylaluminum and trioctylaluminum give superior results. Titanium oxychloride and titanium acetylacetonate, when substituted for titanium tetrachloride give excellent results.

Naturally, when utilizing an inert solvent having a boiling point below the desired reaction temperature, it is necessary to increase the pressure under which the system operates in order to prevent boiling of the inert solvent.

In an advantageous embodiment of the present invention, gas is continuously vented from the reaction zone, the condensable vapors therein are removed together with materials soluble in said hydrocarbon and these are returned to the reaction zone. This affords protection against build-up of a gaseous potential or actual poisoners such as oxygen. It will be realized in this instance that the yield of polymer per part ethylene is based on the amount of ethylene introduced minus the amount purposely vented.

Excellent results are obtained utilizing the aforedescribed catalysts in the presence of the aforedescribed solvents at such a pressure, whether super- or sub-atmospheric, that their boiling points are in the range 50° C.–85° C.

In general, the amount of catalyst utilized varies from about 5 to 15 millimols of each of the catalyst components (A) and (B) per liter of solvent. Similarly, such inert solvents as hexane, heptane, propane, xylene and the like and mixtures thereof, can be utilized and the boiling point varied by operation under sub- or superatmospheric pressure as is necessary dependent upon the boiling point at atmospheric pressure of the selected solvents. Particularly desirable results are obtained utilizing pentane as the inert hydrocabron and operating at a pressure in the range of 10 to 30 p.s.i.

While the invention has been described with reference to particular embodiments thereof, it will be understood that in its broadest aspects the invention may be variously embodied within the scope of the invention as set forth herein and in the appended claims.

I claim:

1. In a low pressure process for the polymerization of ethylene by contacting ethylene and a catalyst in the presence of an organic solvent which has a boiling point within the range of from 50 to 85° centigrade and at a temperature within the range of from 38 to 85° centigrade and below the catalyst decomposition temperature and under pressures of from 10 to 50 pounds per square inch, in which the catalyst is a mixture of (A) and (B), (A) having the general formula RR'AlX, in which R is a member selected from the group consisting of hydrogen, alkyl radicals and aryl radicals, R' is a member selected from the group consisting of hydrogen, alkyl radicals, and aryl radicals, X is a member selected from the group consisting of hydrogen, halogen atoms, alkyloxy radicals, alkyl, aryloxy radicals, secondary amino radicals, secondary acid amide radicals, mercapto radicals, thiophenyl radicals, radicals of carboxylic acids and radicals of sulfonic acids, and in which (B) is selected from the group consisting of inorganic and organic salts of metals of groups IV–B, V–B and VI–B of the periodic system including thorium and uranium, the improvement in said low pressure process of contacting in a reaction zone ethylene and a catalyst in the presence of an inert solvent which comprises the steps of venting gas from said reaction zone while removing condensable vapors of said solvent and constituents soluble therein from said vented gas by condensation and returning said vapors so removed and constituents soluble therein to said reaction zone.

2. In a low pressure process for the polymerization of ethylene by contacting ethylene and a catalyst in the presence of an organic solvent which has a boiling point within the range of from 50 to 85° centigrade and at a temperature within the range of from 38 to 85° centigrade and below the catalyst decomposition temperature and under pressures of from 10 to 50 pounds per square inch, in which the catalyst is a mixture of (A) and (B), (A) having the general formula RR'AlX, in which R is a member selected from the group consisting of hydrogen, alkyl radicals and aryl radicals, R' is a member selected from the group consisting of hydrogen, alkyl radicals, and aryl radicals, X is a member selected from the group consisting of hydrogen, halogen atoms, alkyloxy radicals, alkyl, aryloxy radicals, secondary amino radicals, secondary acid amide radicals, mercapto radicals, thiophenyl radicals, radicals of carboxylic acids and radicals of sulfonic acids, and in which (B) is selected from the group consisting of inorganic and organic salts of metals of groups IV–B, V–B and VI–B of the periodic system including thorium and uranium, the improvement in said low pressure process of contacting in a reaction zone ethylene and a catalyst in the presence of an inert solvent which comprises the steps of venting gas from said reaction zone, condensing vapors of said inert solvent and constituents soluble therein from said vented gas whereby a condensate is obtained and returning said condensate to the reaction zone, the reaction zone being maintained in the range of from about 50° C. to about 85° C.

3. In a low pressure process for the polymerization of ethylene by contacting ethylene and a catalyst in the presence of an organic solvent which has a boiling point within the range of from 50 to 85° centigrade and at a temperature within the range of from 38 to 85° centigrade and below the catalyst decomposition temperature and under pressures of from 10 to 50 pounds per square inch, in which the catalyst is a mixture of (A) and (B), (A) having the general formula RR'AlX, in which R is a member selected from the group consisting of hydrogen, alkyl radicals and aryl radicals, R' is a member selected from the group consisting of hydrogen, alkyl radicals, and aryl radicals, X is a member selected from the group consisting of hydrogen, halogen atoms, alkyloxy radicals, alkyl, aryloxy radicals, secondary amino radicals, secondary acid amide radicals, mercapto radicals, thiophenyl radicals, radicals of carboxylic acids and radicals of sulfonic acids, and in which (B) is selected from the group consisting of inorganic and organic salts of metals of groups IV-B, V-B and VI-B of the periodic system including thorium and uranium, the improvement in said low pressure process of polymerizing ethylene which comprises the steps during the polymerization of removing gaseous constituents from said reaction zone, removing from said gaseous constituents normally liquid constituents and materials soluble therein by condensation whereby a condensate is obtained, returning said normally liquid constituents and said materials soluble therein to said reaction zone, maintaining said reaction zone in the range of from about 50° C. to about 85° C. and recovering the resulting polyethylene.

4. In a low pressure process for the polymerization of ethylene by contacting ethylene and a catalyst in the presence of an organic solvent which has a boiling point within the range of from 50 to 85° centigrade at a temperature within the range of from 38 to 85° centigrade and below the catalyst decomposition temperature and under pressures of from 10 to 50 pounds per square inch, in which the catalyst is a mixture of (A) and (B), (A) having the general formula RR'AlX, in which R is a member selected from the group consisting of hydrogen, alkyl radicals and aryl radicals, R' is a member selected from the group consisting of hydrogen, alkyl radicals, and aryl radicals, X is a member selected from the group consisting of hydrogen, halogen atoms, alkyloxy radicals, alkyl, aryloxy radicals, secondary amino radicals, secondary acid amide radicals, mercapto radicals, thiophenyl radicals, radicals of carboxylic acids and radicals of sulfonic acids, and in which (B) is selected from the group consisting of inorganic and organic salts of metals of groups IV-B, V-B and VI-B of the periodic system including thorium and uranium, the improvement in said low pressure process of polymerizing ethylene which comprises the steps of continuously venting gas from said reaction zone during the polymerization while removing condensable vapors and constituents soluble therein from said vented gas by condensation to obtain a condensate and returning said condensate to the reaction zone, the reaction zone being maintained in the range of from about 50° C. to about 85° C.

5. In a low pressure process for the polymerization of ethylene by contacting ethylene and a catalyst in the presence of an organic solvent which has a boiling point within the range of from 50 to 85° centigrade and at a temperature within the range of from 38 to 85° centigrade and below the catalyst decomposition temperature and under pressures of from 10 to 50 pounds per square inch, in which the catalyst is a mixture of (A) and (B), (A) having the general formula RR'AlX, in which R is a member selected from the group consisting of hydrogen, alkyl radicals and aryl radicals, R' is a member selected from the group consisting of hydrogen, alkyl radicals, and aryl radicals, X is a member selected from the group consisting of hydrogen, halogen atoms, alkyloxy radicals, alkyl, aryloxy radicals, secondary amino radicals, secondary acid amide radicals, mercapto radicals, thiophenyl radicals, radicals of carboxylic acids and radicals of sulfonic acids, and in which (B) is selected from the group consisting of inorganic and organic salts of metals of groups IV-B, V-B and VI-B of the periodic system including thorium and uranium, the improvement in said low pressure process of polymerizing ethylene which comprises the steps of continuously venting gas from said reaction zone, condensing vapors of said inert solvent and constituents soluble therein from said vented gas whereby a condensate is obtained, and returning said condensate to the reaction zone, the reaction zone being maintained in the range of from about 50° C. to about 85° C.

6. A process of claim 1 in which the inert solvent is pentane.

7. A process of claim 1 in which the inert solvent is hexane.

8. A process of claim 1 in which the inert solvent is heptane.

9. A process of claim 1 in which the inert solvent is xylene.

10. A process of claim 1 in which the inert solvent is propane.

11. A process of claim 1 in which the catalyst is a mixture of diethylaluminum chloride and titanium tetrachloride in a 1:1 molar ratio and in an amount of 5–15 millimols each constituent per one liter solvent.

12. A process of claim 1 in which the catalyst is a mixture of di-iso-butylaluminum chloride and titanium tetrachloride in a 1:1 molar ratio and in an amount of 5–15 millimols each per one liter solvent.

13. A process of claim 1 in which the catalyst is a mixture of triethylaluminum and titanium tetrachloride in an amount of 5–15 millimols each constituent per liter solvent.

14. A process of claim 1 in which the catalyst is a mixture of tri-iso-butyl aluminum and titanium tetrachloride in an amount of 5–15 millimols each constituent per liter solvent.

15. A process of claim 1 in which the catalyst is a mixture of di-iso-butylaluminum hydride and titanium tetrachloride in an amount of 5–15 millimols each constituent per liter solvent.

References Cited in the file of this patent

UNITED STATES PATENTS

| | | |
|---|---|---|
| 2,425,638 | Peterson | Aug. 12, 1947 |
| 2,433,045 | Hamilton | Dec. 23, 1947 |
| 2,721,189 | Anderson | Oct. 18, 1955 |
| 2,728,753 | Russum | Dec. 27, 1955 |
| 2,728,754 | Evering | Dec. 27, 1955 |
| 2,728,755 | Weiseman | Dec. 27, 1955 |

FOREIGN PATENTS

| | | |
|---|---|---|
| 533,362 | Belgium | May 16, 1955 |